(12) United States Patent
King et al.

(10) Patent No.: US 6,501,435 B1
(45) Date of Patent: Dec. 31, 2002

(54) WIRELESS COMMUNICATION DEVICE AND METHOD

(75) Inventors: Patrick F. King, Glen Ellyn, IL (US); Ian J. Forster, Essex (GB)

(73) Assignee: Marconi Communications Inc.

( * ) Notice: Subject to any disclaimer, the term of this patent is extended or adjusted under 35 U.S.C. 154(b) by 0 days.

(21) Appl. No.: 09/678,271

(22) Filed: Oct. 3, 2000

Related U.S. Application Data

(63) Continuation-in-part of application No. 09/618,505, filed on Jul. 18, 2000.

(51) Int. Cl.[7] ............................................. H01Q 9/28
(52) U.S. Cl. ......................... 343/795; 343/700 MS; 343/793; 340/572.7
(58) Field of Search ........................ 343/700 MS, 746, 343/795, 793, 846, 866, 867, 872, 845; 340/572.7

(56) References Cited

U.S. PATENT DOCUMENTS

| | | | | |
|---|---|---|---|---|
| 3,972,049 A | * | 7/1976 | Kaloi ............................ 343/829 |
| 4,575,725 A | | 3/1986 | Tresselt ........................ 343/700 |
| 4,850,020 A | | 7/1989 | Kahn ............................ 381/16 |
| 4,873,532 A | | 10/1989 | Sakurai et al. ................ 343/713 |
| 4,947,181 A | | 8/1990 | Duncan et al. ............... 343/773 |
| 4,975,711 A | | 12/1990 | Lee .............................. 343/702 |
| 5,006,857 A | | 4/1991 | DeHart ......................... 343/700 |
| 5,073,971 A | | 12/1991 | Schaeffer ..................... 455/33 |
| 5,155,493 A | | 10/1992 | Thursby et al. ............... 343/700 |
| 5,187,489 A | | 2/1993 | Whelan et al. ............... 343/767 |
| 5,216,430 A | | 6/1993 | Rahm et al. .................. 343/700 |
| 5,216,435 A | | 6/1993 | Hirata et al. .................. 343/853 |
| 5,315,303 A | | 5/1994 | Tsou et al. .................... 342/27 |
| 5,347,280 A | | 9/1994 | Schuermann .................. 342/42 |
| 5,508,706 A | | 4/1996 | Tsou et al. .................... 342/192 |
| 5,512,901 A | | 4/1996 | Chen et al. .................... 342/175 |
| 5,541,399 A | | 7/1996 | de Vall ......................... 235/491 |
| 5,566,441 A | | 10/1996 | Marsh et al. .................. 29/600 |
| 5,600,333 A | | 2/1997 | Justice et al. ................. 343/713 |
| 5,826,175 A | | 10/1998 | Schmidt et al. ............... 455/77 |
| 5,922,550 A | | 7/1999 | Everhart et al. .............. 435/7.21 |
| 5,929,760 A | | 7/1999 | Monahan ...................... 340/572.7 |
| 5,929,820 A | | 7/1999 | Caulfield et al. ............. 343/761 |
| 5,972,152 A | | 10/1999 | Lake et al. .................... 156/247 |
| 5,973,600 A | | 10/1999 | Mosher, Jr. ................... 340/572.8 |
| 5,973,648 A | | 10/1999 | Lindenmeier et al. ........ 343/713 |
| 6,018,299 A | * | 1/2000 | Eberhardt ..................... 340/572.7 |
| 6,027,622 A | | 2/2000 | Graser et al. ................. 204/426 |
| 6,054,961 A | | 4/2000 | Gong et al. ................... 343/713 |
| 6,057,803 A | | 5/2000 | Kane et al. .................... 343/713 |
| 6,075,493 A | | 6/2000 | Sugawara et al. ............ 343/767 |
| 6,100,804 A | | 8/2000 | Brady et al. .................. 340/572.7 |
| 6,114,962 A | | 9/2000 | Wiklof et al. ................. 340/572.8 |
| 6,118,426 A | | 9/2000 | Albert et al. .................. 345/107 |
| 6,239,765 B1 | * | 5/2001 | Johnson et al. ............... 343/795 |

FOREIGN PATENT DOCUMENTS

WO     WO 97/24689     7/1997

* cited by examiner

*Primary Examiner*—Don Wong
*Assistant Examiner*—Shih-Chao Chen
(74) *Attorney, Agent, or Firm*—Withrow & Terranova, P.L.L.C.

(57) ABSTRACT

The wireless communication device contains at least one conductive tab that provides an antenna. The tab(s) form a pole antenna, and the tabs may also be attached across a slot to form a slot antenna. The tab(s) may be attached across a slot created in a package to form a slot antenna, or the tab(s) may be attached to a slot that is created as part of the wireless communication device to form a slot antenna. The tab(s) and/or the slot may also contain an adhesive material to attach the wireless communication device to a package, container or other material. More than one slot may be provided to form a circularly polarized antenna. The carrier may be a conductive material in which tabs are formed as part of the carrier before the wireless communication device is attached. The wireless communication device may have an asymmetrical antenna arrangement.

47 Claims, 19 Drawing Sheets

WIRELESS COMMUNICATION DEVICE AND METHOD

RELATED APPLICATIONS

This application is a continuation-in-part of pending patent application entitled "Wireless Communication Device and Method," Ser. No. 09/618,505, filed on Jul. 18, 2000.

FIELD OF THE INVENTION

The present invention relates to an apparatus, system and method of providing a wireless communication device and communication of information concerning an item containing the wireless communication device.

BACKGROUND OF THE INVENTION

It is often desired to track and identify items, such as packages, containers, etc., and to communicate information concerning such items wirelessly. One method of tracking and providing information concerning packages is to attach a wireless communication device, such as a radio frequency identification (RFID) transponder or other identification device, to packages. The information communicated concerning the packages may include expiration dates, "born on" dates, lot numbers, manufacturing information, and the like. A wireless communication device may be attached to an individual package or to a container containing multiple packages.

A problem exists when a wireless communication device is attached to packaging or containers constructed out of a conductive material such as foil. A pole antenna connected to the wireless communication device will not radiate properly if the wireless communication device is attached on the outside of the package. The pole antenna will be shielded if the wireless communication device is placed inside the package. Thus, there exists a need for a wireless communication device that performs well when attached to a conductive packaging or container.

It may be advantageous for such a wireless communication device to communicate on different frequencies so that one device can be used for various applications. For instance, an operating frequency of 2.45 GHz is used frequently outside the United States, but an operating frequency of 915 MHz is frequently used in the United States. Many companies manufacture wireless communication devices that are capable of operating at both 915 MHz and 2.45 GHz frequencies so that either frequency can be chosen for operation. However, wireless communications device applications, such as attaching wireless communication devices to packages for informative and tracking purposes, configure the device to communicate on only one frequency—either a frequency for the United States or a frequency for use abroad. It would be advantageous to construct a wireless communication device with an antenna structure that is capable of communicating at more than one frequency. This would allow one wireless communication device to be applicable for uses in both the United States and abroad.

In addition to conductive materials, wireless communication devices are also used with many other substrates. Each substrate has its own dielectric characteristics which typically affect the impedance matching between the wireless communication device and its antenna. Impedance matching ensures the most efficient energy transfer between an antenna and the wireless communication device. Therefore, a need exists to provide an antenna for a wireless communication device whose impedance is substantially insensitive to the substrate.

SUMMARY OF THE INVENTION

The present invention relates to a wireless communication device associated with a package, container or other material to communicate information concerning the package, container or other material. A wireless communication device is provided that contains a control system, communication electronics, memory, and an antenna. The wireless communication device may contain a sensor to sense environmental conditions surrounding the wireless communication device. The wireless communication device contains one or more tabs constructed out of conductive material. The tab(s) may serve as both a pole antenna and may attach the wireless communication device to a slot, thereby forming a slot antenna. While helpful in some embodiments such is not required in all the embodiments herein presented.

In one embodiment, the wireless communication device is a transponder that is interrogated by an interrogation reader for communication purposes. The wireless communication device is attached to a package that may be constructed out of a conductive material, such as foil packaging used for food or liquid.

The tab(s) attach to the surface of the package. In one embodiment, the tab(s) are attached to the surface of a package. In a different embodiment, the tab(s) are reactively coupled to the surface of the package through a dielectric material. The dielectric material can be an adhesive material placed on the tab(s) to attach the wireless communication device to a package.

In another embodiment, the tab(s) form a pole antenna to communicate in a first mode at one frequency, and the tab(s) are attached across a slot in a package to communicate in a second mode at a second frequency. One tab is used in one embodiment to form a monopole type antenna, and two tabs are used in another embodiment to form a dipole antenna. In another embodiment, the tab(s) can be varied in shape and size to adjust to surfaces that vary in form.

In another embodiment, the width of the slot is varied to match the impedance of the slot to the impedance of the wireless communication device. Another embodiment uses a matching network to match the impedance of the slot to the impedance of the wireless communication device.

In another embodiment, the wireless communication device operates inside packaging constructed out of a conductive material, such as foil, and uses a slot cut in the packaging to form a slot antenna. Another embodiment forms a slot inside the packaging by placing a non-conductive material, such as a dielectric, in between a sealed portion of the package. The wireless communication device attaches to the slot to form a slot antenna.

In another embodiment, the wireless communication device reacts to the opening of the package and communicates such event and/or stores it in memory. In another embodiment, the wireless communication device uses a sensor to sense the environment and to detect when the package is opened. A second seal may be provided in the package so that the wireless communication device inside the package does not come into contact with the contents of the package.

The wireless communication devices can be placed in a carrier or support, divided into portions, with one device per carrier portion during manufacturing. The carrier or support may be a conductive material, whereby one or more conductive tabs are formed as part of the carrier. The wireless communication device is attached to the carrier thereby attaching the wireless communication device to one or more conductive tabs. The carrier or support is placed proximate to packages during manufacture, and the wireless communication devices are attached to the packages by stamping the devices onto the packages either across a slot cut into the packages, or to a slot formed by the package.

An asymmetrical antenna arrangement may be provided so that the impedance of the antenna is not substantially affected by the substrate to which the wireless communication device is attached. In one embodiment, the asymmetrical antenna arrangement is an asymmetrical dipole antenna formed by asymmetrical tabs. For example, the wireless communication device may be placed in an indentation in the substrate so that the wireless communication device does not protrude from the substrate surface. Asymmetrical tabs are placed on the surface of the substrate. The asymmetrical tabs are connected to the wireless communication device with feed lines to provide an asymmetrical dipole antenna. In a second embodiment, the asymmetrical antenna arrangement is an asymmetrical slot antenna.

DETAILED DESCRIPTION OF THE INVENTION

The present invention is directed to a device, system and method of attaching a wireless communication device, such as a radio frequency identification device (RFID), to a package or container to communicate information about the package or container. The package may be an individual package containing specific contents, or an individual, exterior package containing a group of additional, interior individual packages. The word "package" and "container" are used interchangeably herein to describe a material that houses contents, such as goods or other individual packages, and equivalent structures. The present invention should not be limited to any particular meaning or method when either "package" or "container" is used.

Figure 1:
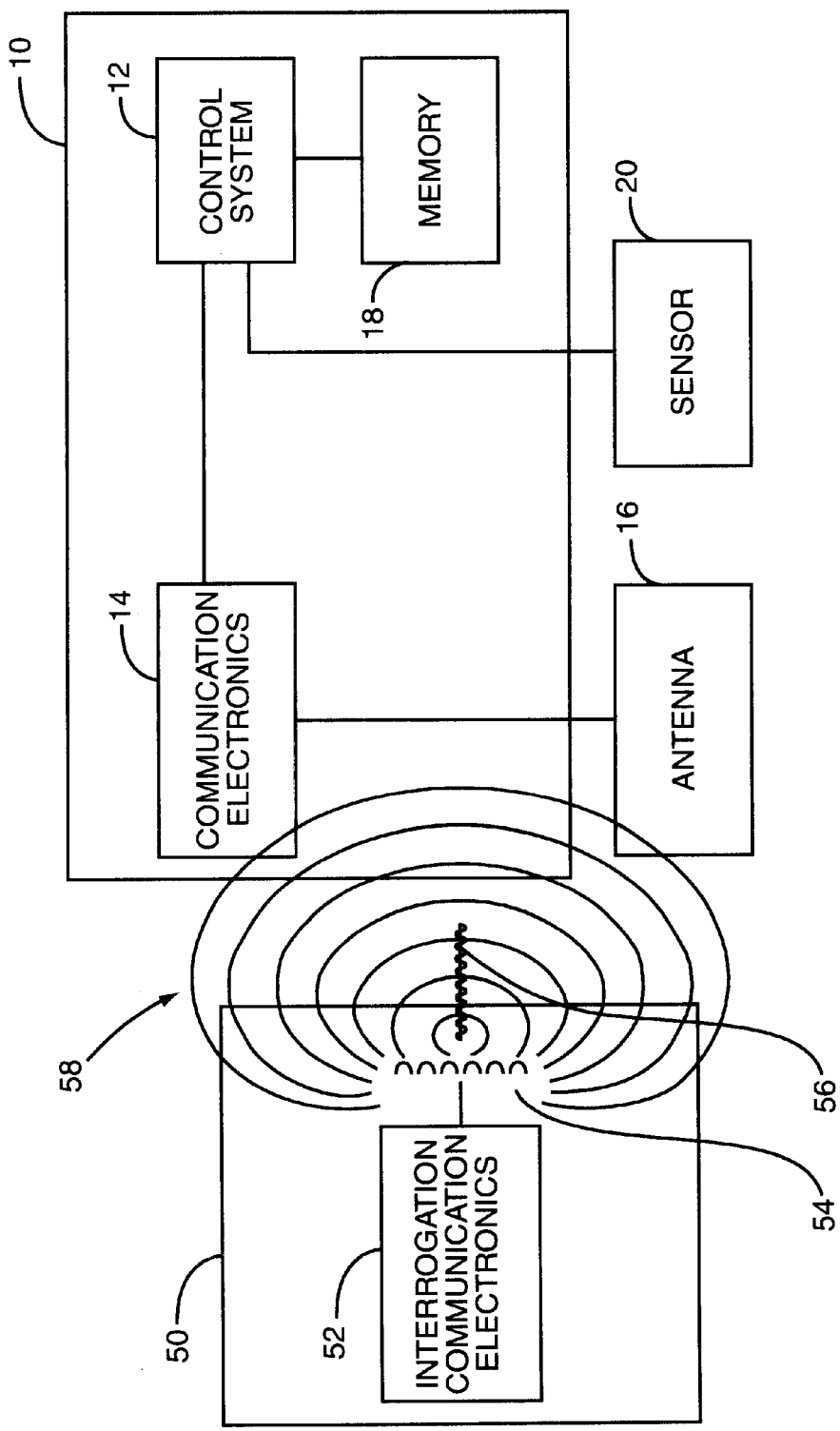
FIG. 1 is a schematic diagram illustrating communication between a wireless communication device and an interrogation reader.

As illustrated in FIG. 1, the invention includes a wireless communication device 10 for electronic communication. Some wireless communication devices 10 have both a transmitter and receiver. Other wireless communication devices 10, known in the art as "transponders," are interrogated by interrogation reader 50, whereby the transponder communicates back by altering field 58 containing interrogation signal 56. This description refers to the terms "transponder" and wireless communication device 10 interchangeably, and the use of the term transponder is not intended to limit the type of wireless communication device 10 applicable to the present invention. Wireless communication devices 10 are available that communicate at various frequencies, including UHF and VHF. One embodiment of the present invention uses a wireless communication device 10, also called a "transponder," that is a passive radio-frequency device with the ability to rectify incoming radio energy and provide power to power the device for communication and operation. The invention is also applicable to active devices that have their own power source for communications. It should be readily understood to one of ordinary skill in the art that there are many other different types of wireless communication devices 10 that allow electronic communication and thus the present invention is not limited to any one particular type.

Transponder 10 includes a control system 12 and communication electronics 14. Transponder 10 may also contain memory 18 for storage of information to be communicated to an interrogation reader 50. Alternatively, transponder 10 may store information such as an identification number or other information by using diodes, dip switches or some other like circuitry in lieu of erasable memory 18. Antenna 16 is provided to receive the interrogation signal 56 from interrogation reader 50. Antenna 16 may be either external to or internal to transponder 10. The particular type and location of antenna 16 will depend on the operating frequency of transponder 10 and the particular design desired. Transponder 10 may also be connected to sensor 20 for sensing ambient or environmental information surrounding transponder 10, package 200 containing transponder 10, or the contents of package 200. One example of sensor 20 may be a quartz crystal resonator like that described in U.S. Pat. No. 5,922,550, entitled "Biosensing devices which produce diffraction images," incorporated herein by reference its entirety. A quartz crystal resonator detects analytes that may be present in food. Analytes include, but are not limited to, microorganisms such as bacteria, yeasts, fungi and viruses.

Antenna 16 receives signal 56 through the radiated interrogation field 58. Antenna 16 passes received signals 56 to communication electronics 14. Communication electronics 14 contain circuitry necessary to interpret signal 56 from field 58 and to further communicate the interpreted signal to control system 12. Control system 12 is an integrated circuit, printed circuit board, or other type of microprocessor or micro-controller electronics that controls the operations of the transponder 10. Control system 12 is connected to communication electronics 14 to communicate and receive transmissions. Control system 12 is also connected to memory 18 for storing and retrieving information. Control system 12 may further include a clock (not shown). Control system 12 determines if any actions are needed in response to the communications received from communication electronics 14.

FIG. 1 also depicts how communication is achieved with transponder 10 using an interrogation reader 50. Interrogation reader 50 contains interrogation communication electronics 52 and an interrogation antenna 54. Interrogation reader 50 communicates with the transponder 10 by emitting an electronic signal 56 modulated in a frequency by interrogation communication electronics 52 through interrogation antenna 54. Interrogation antenna 54 may be any type of antenna that can radiate signal 56 through a field 58 so that a compatible device, such as transponder 10, can receive such signal 56 through its own antenna 16. Field 58 could be electromagnetic, magnetic, or electric. Signal 56 is a message containing information or a specific request for the transponder 10.

When antenna 16 is in the presence of field 58 emitted by interrogation reader 50, communication electronics 14 are energized by signal 56, thereby energizing transponder 10. Transponder 10 remains energized so long as antenna 16 is in the field 58 of interrogation reader 50. Communication electronics 14 demodulates signal 56 and sends the message containing information or request to control system 12 for appropriate actions. For example, the request may be for transponder 10 to communicate its identification, or information about a material or package containing transponder 10, such as date of manufacture, place of manufacture, and/or lot number. The message may also be a request for information regarding ambient or environmental measurements sensed by sensor 20.

Another description of a transponder 10 that may be used with the present invention is located in U.S. Pat. No. 5,347,280, entitled "Frequency diversity transponder arrangement," incorporated herein by reference in its entirety. Transponder 10 is one type of wireless communication device. Other types of wireless communication devices 10 may be used with the present invention. For instance, transponder 10 may have a transmitter that can send information to interrogation reader 50 without having to alter signal 56. Transponder 10 may contain a battery to power the transmitter, or an energy storage unit that is charged by energy received from signal 56 when wireless communication device 10 is in the range of field 58. It is readily understood to one of ordinary skill in the art that there are many other types of wireless communications devices and communication techniques than those described herein, and the present invention is not limited to a particular type of device, technique or method.

Transponder 10 may be attached on any type of device or package to identify and communicate information concerning the device or package. For instance, transponder 10 can be attached to a food package and may contain identification information and other information about the food contained inside the package, such as its date of manufacture, "born on" date, expiration date for sale or consumption and lot number. For example, transponder 10 can be attached to a wine bottle and contain information concerning the type of wine and its ingredients or make up, the date of manufacture, and expiration dates. Transponder 10 can be attached to virtually any device or package conceivable.

Figure 2:
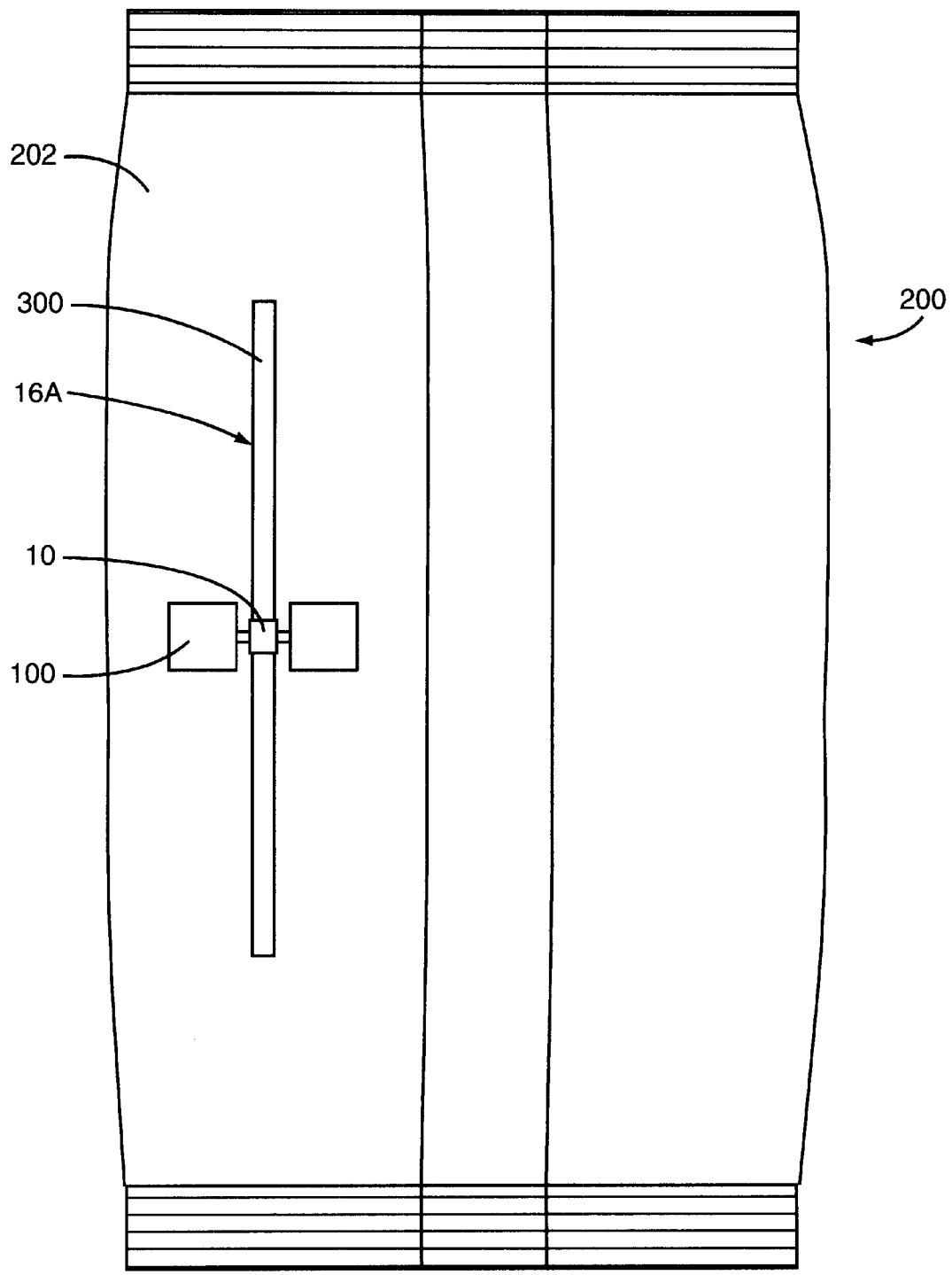
FIG. 2 is an illustration of the wireless communication device with slot antenna on a foil food package.
Figure 3A:
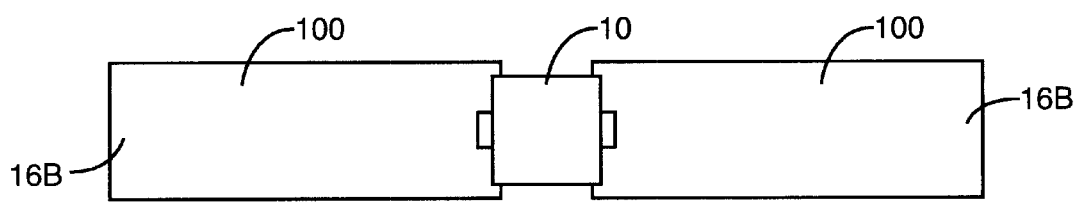
FIG. 3A is a schematic top view diagram of the wireless communication device with coupling tab devices containing a dielectric, adhesive material.
Figure 3B:
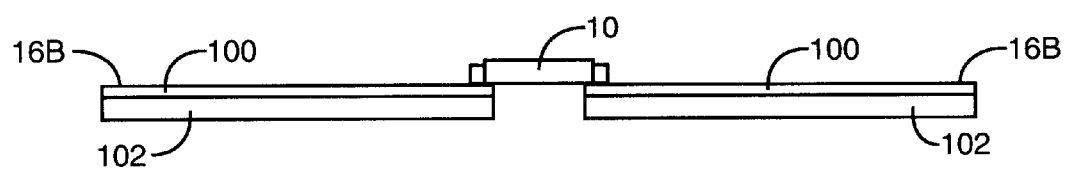
FIG. 3B is a schematic side view diagram of the wireless communication device in FIG. 3A.

FIG. 2 illustrates transponder 10 attached to a food package 200. Antenna 16 can either be a slot antenna 16A, as illustrated in FIG. 2, or a pole antenna 16B, as illustrated in FIGS. 3A and 3B). A slot 300 is provided in package 200 to provide a slot antenna 16A. Package 200 includes a surface 202. At least one tab, made out of conductive material, such as a metallic material, is attached to transponder 10, and more particularly to communication electronics 14 inside transponder 10. Two or more tabs 100 may also be attached to transponder 10 to provide antenna 16. The use of "tab" is used in singular and plural herein, and reference in either form is not intended to limit the invention to only one tab 100, or more than one tab 100.

Tabs 100 are attached to slot 300 to form a slot antenna 16A. For the purposes of this specification, the word "attached" is used generically to mean either attached directly or connected to slot 300. The tabs 100 may either be attached on slot 300 or proximate to slot 300. Tabs 100 may also serve as pole antenna 16B. Tabs 100 may also be constructed by applying a conductive fluid (e.g. conductive ink) onto surface 202.

The present invention can also be used with transponder 10 containing one tab 100 to form either slot antenna 16A or pole antenna 16B. One tab 100 can be used to form pole antenna 16B in the form of antenna having monopole-like radiation pattern. If one tab 100 is used to form slot antenna 16B, tab 100 is attached to slot 300, and transponder 10 is attached, in the form of grounding, to slot 300 to form a ground plane. Using one tab 100 as a slot antenna 16B will create a monopole-like radiation pattern.

If surface 202 is constructed out of a conductive material, it may be advantageous to use tabs 100 to create a slot antenna 16A rather than a pole antenna 16B. Examples of conductive surfaces 202 include food foil packaging, wine bottles cork foil, jewelry, watches, cigar label foil, and alcoholic bottle foil labels. If tabs 100 are attached on a conductive surface 202 without forming a slot antenna 16A, the radiation pattern of the resulting pole antenna 16B created by tabs 100 may not be properly tuned to the operating frequency of transponder 10. Factors such as the conductivity and surface area of surface 202 affect the radiation pattern of a pole antenna 16B formed by tabs 100 when tabs 100 are attached to surface 202. Packages 200 vary greatly in size, shape, and area. It is desirable for transponder 10 and tabs 100 to be manufactured such that transponder 10 operates at a desired frequency when using tabs 100 as a pole antenna 16B, regardless of the particular characteristics of package 200.

Packages 200 that are constructed out of conductive material, such as foil, containing transponder 10 inside the package 200 cannot use a pole antenna 16B. The radiation pattern of pole antenna 16B is shielded by the conductive material. Therefore, another reason for using tabs 100 to create a slot antenna 16A rather than a pole antenna 16B may be so that packages constructed out of conductive material and containing transponder 10 inside package 200 can effectively communicate desired information wirelessly.

If tabs 100 are attached on surface 202 that is not conductive, tabs 100 can function at the desired operating frequency as a pole antenna 16B, regardless of the characteristics of package 200. If two tabs 100 are used, the tabs 100 serve as a dipole antenna 16B. One tab 100, instead of two tabs 100, may also be used to serve as antenna 16, creating a monopole type radiation pattern as previously described above. A ground plane may be provided between transponder 10 and surface 202 such that communication electronics 12 is attached to surface 202 to from a ground. In summary, tabs 100 can serve to provide either a pole antenna 16B or slot antenna 16A depending on the package 200 and its characteristics.

Figure 3C:
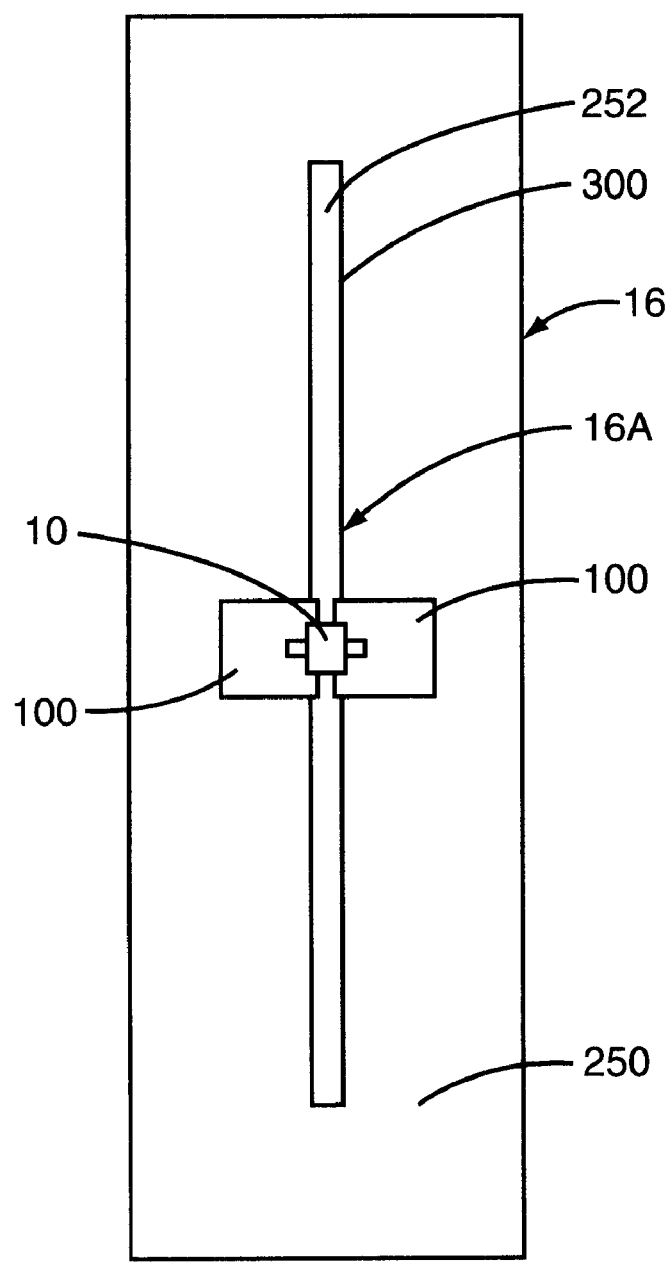
FIG. 3C is a schematic diagram of the wireless communication device having its own slot.

FIGS. 3A, 3B and 3C illustrate transponder 10 shown in FIG. 2 in more detail. FIG. 3A illustrates transponder 10 from a top view perspective. Tabs 100 are made out of a conductive material. For example, tabs 100 may be constructed out of metals, such as aluminum or copper. FIG. 3B illustrates transponder 100 from a side view perspective. Tabs 100 can either be attached directly to surface 202 or coupled to surface 202 by placing tabs 100 on an optional dielectric adhesive material 102 that is attached to surface 202. Use of adhesive material 102 may be necessary to attach the transponder 10 to surface 202. If transponder 10 is attached on a package 200 constructed out of a conductive material without a slot 300, such that tabs 100 act as a dipole antenna 16B, a dielectric material 102 may be attached between the surface 202 and tabs 100 so that the radiation pattern of the dipole antenna 16B is not affected by the conductive package 200. If such a dielectric material 102 is used, tabs 100 are reactively coupled, rather than directly connected, to surface 202. One tab 100, instead of two tabs 100, may also be used to serve as antenna 16, creating a monopole type radiation pattern. If transponder 10, with tabs 100, is attached across a slot 300 in a conductive surface 202, a slot antenna 16A is formed for antenna 16.

A transponder 10 may be attached to a slot antenna 16A as part of its construction, instead of using a slot 300 created in package 200 to form a slot antenna 16A. FIG. 3C illustrates slot 300 as a rectangular, conductive material 250 having a hollow portion cut out to form an inner, non-conductive portion 252. Tabs 100 are attached to non-conductive portion 252. Slot 300 may be constructed in any shape desired so long as slot 300 is constructed out of a conductive material 250 that contains an inner, non-conductive portion 252. This inner, non-conductive portion 252 can be air, formed by a cut out as illustrated in FIG. 3C, or can be formed by placing a non-conductive material, such as plastic, onto or inside conductive material 250. The conductive material 250 may also contain an adhesive 102, so that slot 300, with transponder 10 attached, can be easily attached to package 200. It may be desirable to provide slot 300 as part of transponder 10, instead of package 200, insofar as this eliminates the requirement to create a slot 300 in package 200 as part of the construction of package 200. For example, it may be impractical or impossible to provide a slot 300 in package 200, but still desirable to attach transponder 10 to package 200 using a slot antenna 16A. As an additional advantage of this embodiment illustrated in FIG. 3C, since slot 300 is provided as part of transponder 10, package 200 can be constructed out of non-conductive material.

Figure 4:
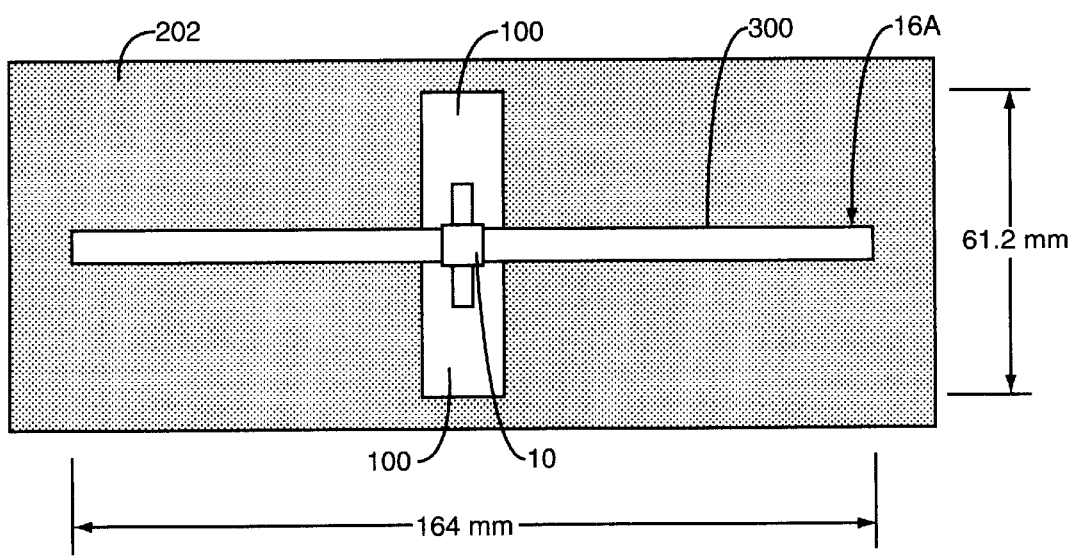
FIG. 4 is a schematic diagram of the wireless communication device attached across a slot to form a slot antenna.

FIG. 4 illustrates transponder 10 with tabs 100 acting as both a pole antenna 16B and slot antenna 16A. A slot 300 is provided by cutting out a portion of conductive surface 202. The length of the tabs 100 define the operating frequency of the antenna 16 if tabs 100 are configured to act as a pole antenna 16B. In one embodiment, the tabs 100 are each $\lambda/4$ in length, or 30.6 millimeters each, to form a dipole antenna 16B with a total length of $\lambda/2$ and an operating frequency of 2.45 GHz.

As previously discussed, tabs 100 may also serve to form a slot antenna 16A if attached across a slot 300 in a conductive surface 202. The slot 300 length defines the operating frequency of the slot antenna 16A. In one embodiment, the slot 300 length is $\lambda/2$ or 164 millimeters so that the transponder 10 operates at a frequency of 915 MHz. More information on slot antennas 16A and their operation is described in U.S. Pat. No. 4,975,711, entitled "Slot antenna device for portable radiophone," incorporated herein by reference in its entirety.

In this manner, the transponder 10 has two antenna 16 configurations that are capable of communicating at two frequencies. If transponder 10 is capable of communicating at two different frequencies, as discussed above, the pole antenna 16B and slot antenna 16A can be configured to communicate at different frequencies as well, enabling the transponder 10 to effectively communicative at both frequencies. This arrangement provides an advantage in particular if 915 MHz is a desired frequency. 915 MHz is frequently used as an operating frequency for electronic communication in the United States, but 2.45 GHz is frequently used outside the United States. Therefore, providing transponder 10 with the capability of communicating at both 915 MHz and 2.45 GHz is advantageous so that transponder 10 can be used for applications in both the United States and abroad. However, if this dual capability is not required, transponder 10 can be configured to operate solely using a pole antenna 16B or slot antenna 16A.

Figure 5A:
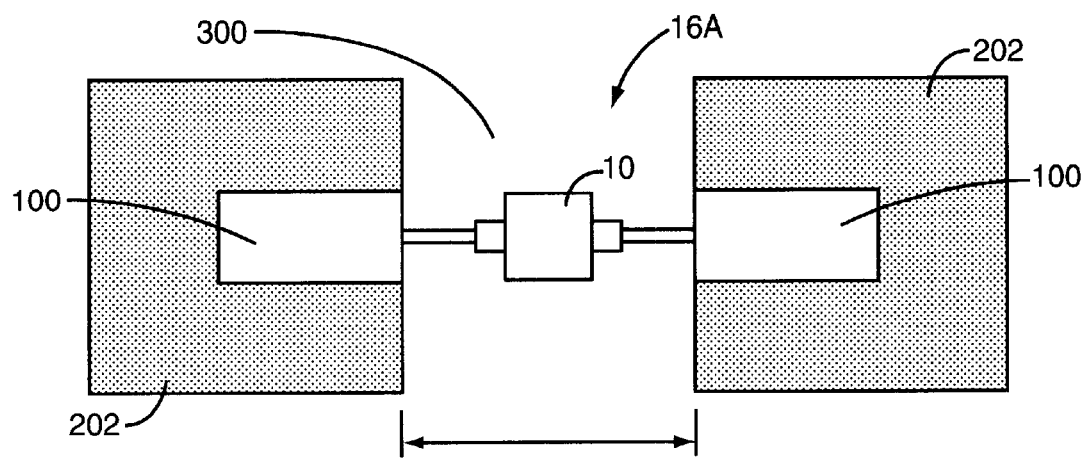
FIG. 5A is a schematic diagram of the wireless communication device having a slot antenna of a particular width to match the impedance between the wireless communication device and the slot.
Figure 5B:
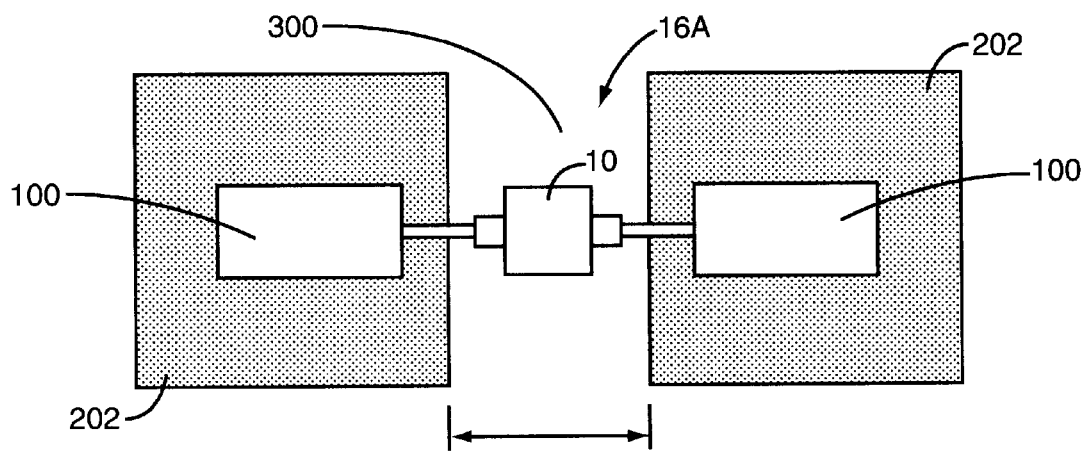
FIG. 5B is a schematic diagram of the wireless communication device illustrated in FIG. 5A with a slot of different width.

FIGS. 5A and 5B illustrate transponder 10 attached across slots 300 of varying widths. The width of slot 300 affects the impedance of slot 300. For example, a wider slot 300, illustrated in FIG. 5A, may have a higher impedance than the narrower slot 300, illustrated in FIG. 5B. Varying the slot 300 width varies the impedance of the slot antenna 16B to maximize antenna 16 strength. It is desirable to match the impedance of slot 300 to the impedance of transponder 10. In the one embodiment, the slot antenna 16A has a fairly low impedance. Therefore, it is desirable to transform the slot 300 impedance so as to match the impedance of transponder 10, thereby maximizing energy transfer between transponder 10 and slot 300 and maximizing the strength of the radiation pattern emitted by the slot antenna 16A. Matching the impedances also minimizes reflection in the radiation pattern of slot antenna 16A. Transponder 10 may comprise more than one layer, including conductive, dielectric and magnetic materials, such as ferrites, to introduce inductance, thereby aiding modification of the characteristics of surface 202 for impedance matching purposes.

In addition to the composition of transponder 10, the area of tabs 100 affect the impedance of transponder 10. As discussed above, it is desirable to match the impedance of transponder 10 and slot 300. Tabs 100 can also be varied to ensure optimal coupling to surface 202. The impedance of slot 300 may be varied for matching purposes by modifying relevant characteristics of surface 202. For example, a conductive package for food (e.g. foil) may have a surface 202 that is variable in width, dielectric or metallic characteristics. Capacitance of tabs 100 may be taken into consideration for impedance matching when attaching tabs 100 to a particular surface 202. The capacitance of tabs 100 affects the impedance of transponder 10. The total volume of tabs 100 (surface area times thickness) affects their capacitance. Tabs 100 are similar to parallel plate capacitors in series with wireless communication device 10. The larger the volume of tabs 100, the larger their capacitance. It is therefore desirable to design and construct tabs 100 with a capacitance that is commensurate with surface 202 to match impedance of transponder 10 and slot 300 for optimal performance.

An impedance matching network may also be used to match slot 300 impedance to transponder 10 impedance, as discussed in patent application Ser. No. 09/536,334, entitled "Remote Communication Using Slot Antenna," assigned to assignee of the present invention, and incorporated herein by reference in its entirety.

Figure 6:
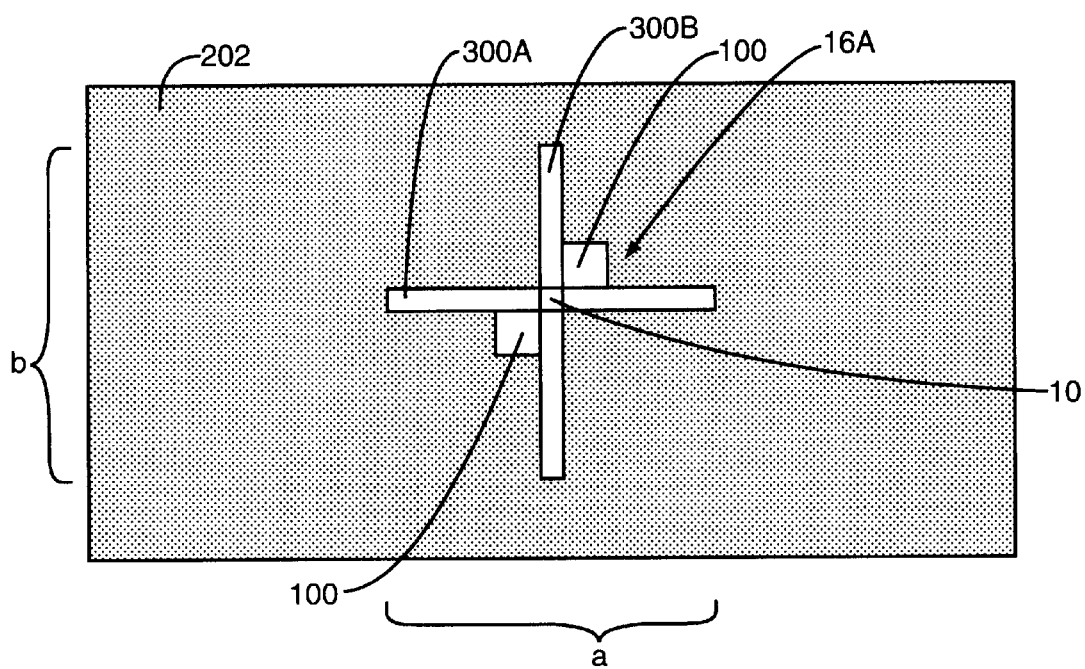
FIG. 6 is a schematic diagram of a circularly polarized slot antenna.

FIG. 6 illustrates two slots 300A, 300B in surface 202 that are substantially perpendicular to each other, with tabs 100 attached across the slots 300A and 300B. The tabs 100 are attached to slots 300A, 300B at vertical angles, but tabs 100 can also attach to slots 300A, 300B adjacent to each other. This structure creates a circularly polarized slot antenna 16A. Tabs 100 are attached to each of slots 300A and 300B. The length of the first slot 300A, a, is slightly shorter than $\lambda/2$. The length of the second slot 300B, b, is slightly greater than $\lambda/2$. The two slots 300A, 300B provide antennas 16 that can be considered resonant circuits, with their associated phase delay at the operating frequency of ±45 degrees to each other. This causes transponder 10 to receive efficiently radiation in more than one dimension and, specifically, in the form of a circular pattern so that the orientation of transponder 10 on surface 202 is somewhat irrelevant for communication.

Figure 7:
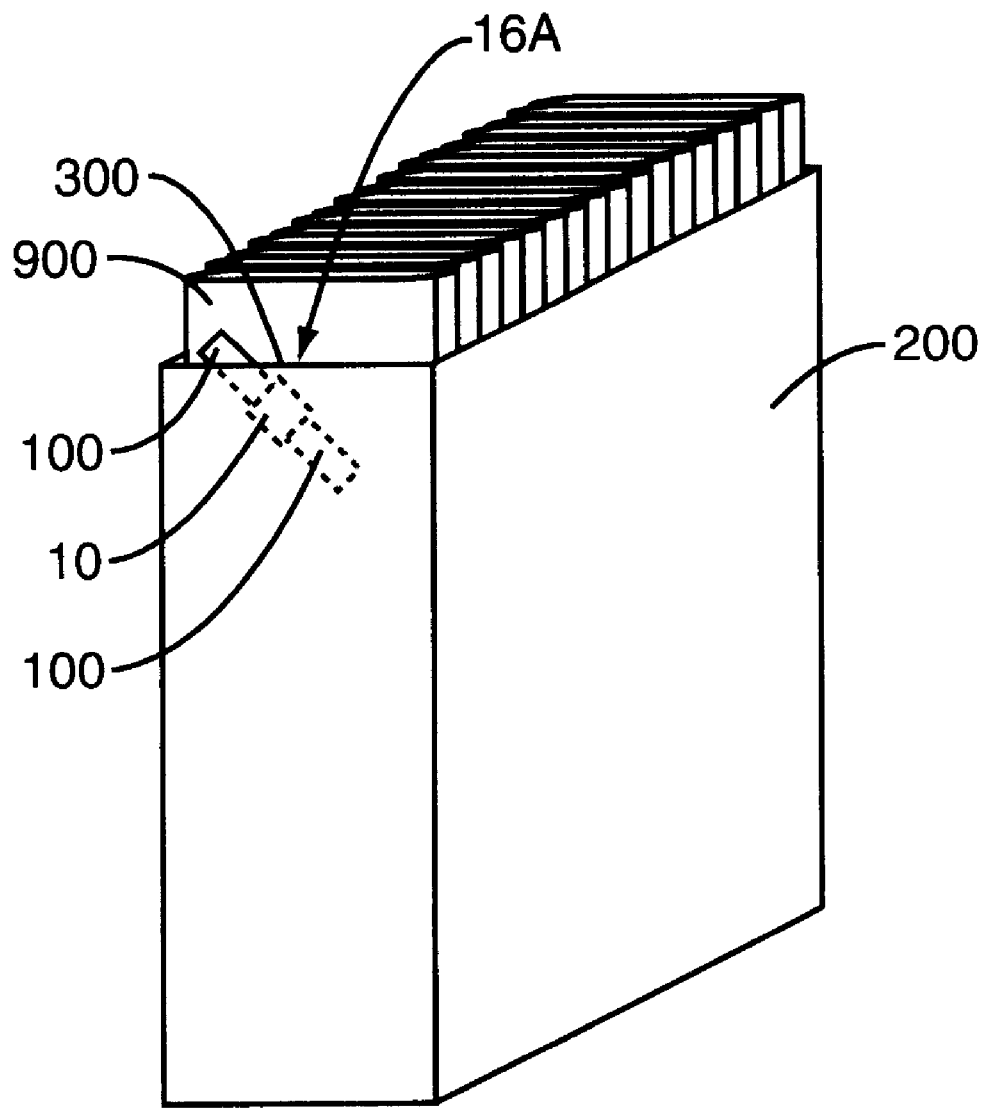
FIG. 7 is a schematic diagram of another type of packaging containing a wireless communication device.

FIG. 7 illustrates another type of package 200 containing transponder 10. Package 200 is configured to contain gum sticks (not shown). The package 200 is constructed out of a conductive material. Gum sticks are wrapped in their own individual foil wrappers and are placed inside paper non-conductive wrappings 900 contained inside package 200. Parts of the non-conductive wrappings 900 touch or couple to the interior of package 200. Such attaching or coupling provides a slot antenna 300 as previously discussed, where the non-conductive wrappings provide slot 300 and the package 200 inside provides the surrounding conductive material. FIG. 7 illustrates transponder 10 placed inside package 200. Tabs 100 are attached to slot 300, as previously described, to provide communication. Again, tabs 100 are also capable of operating as a pole antenna 16A. The package 200 could also be a cigarette package 200. Again, the tabs 100 may be attached to a slot 300, formed by conductive material of the package 200 surrounding to an internal non-conductive portion internal to package 200, to form slot antenna 16A. In a variation on this embodiment, the slot 300 may be the dielectric that forms the tear away strip that allows such packages to be opened.

Figure 8A:
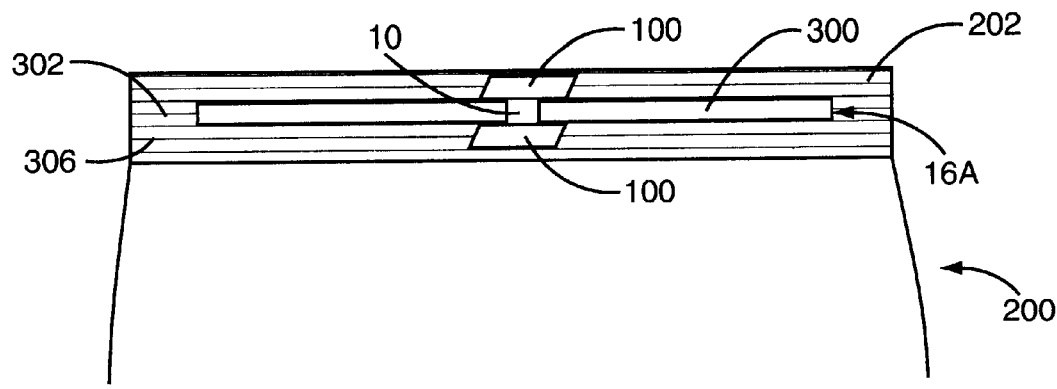
FIG. 8A is a schematic diagram of the wireless communication device having a slot antenna formed by a foil package closing.
Figure 8B:
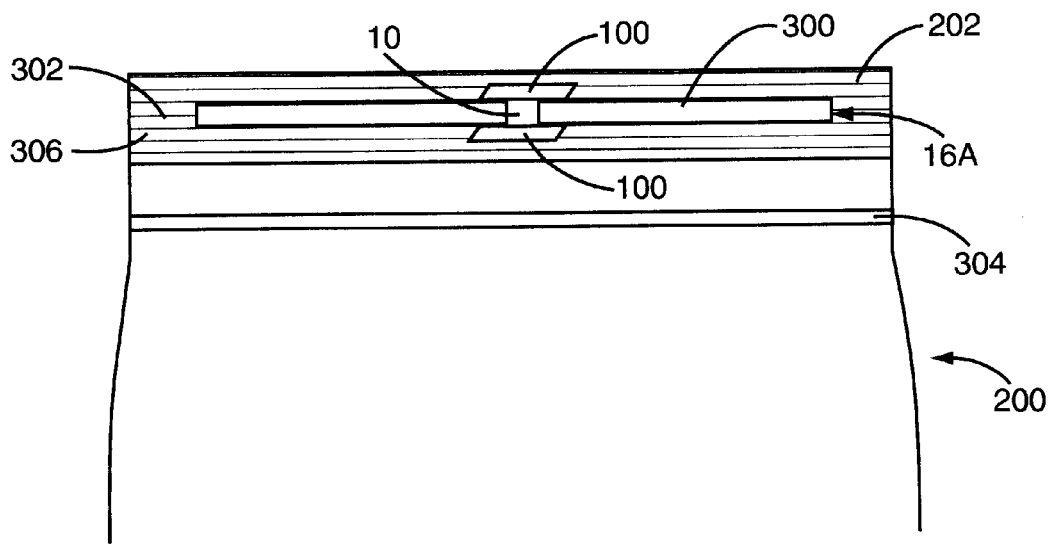
FIG. 8B is a schematic diagram of the wireless communication device illustrated in FIG. 8A with the foil package having an additional seal below the wireless communication device.

FIGS. 8A and 8B illustrate particular manners in which transponder 10 is placed inside package 200. FIG. 8A illustrates transponder 10 located inside the top of package 200 where package 200 opens and seals in a pouch-like fashion. Transponder 10 and tabs 100 are placed inside the top 300. The inside surface 202 of package 200 is a conductive material, such as a foil, including the sides of package 200 that come together when package 200 is closed and sealed. As discussed previously, it is desirable to configure transponder 10 to communicate using a slot antenna 16A when transponder 10 is inside a package 200 constructed out of conductive material. In this embodiment, slot antenna 16A is not formed by cutting out a portion of surface 202, but rather by inserting a non-conductive material 302, such as a dielectric, inside package 200 at the top to form a seal 306 where the sides come together. In this manner, a slot 300 is formed by the separation of the conductive material of inner surface 202 when the sides of package 200, are closed and sealed. Such a method of placing a transponder 10 inside a package 200 may be advantageous where it is desired to protect transponder 10 from theft, tampering or other unwanted elements.

Placing transponder 10 inside package 200 may also be useful to indicate if package 200 has been opened, and, therefore, possibly contaminated. Packages 200 that contain food for consumption or medical devices and equipment requiring sterility are also possible applications. Transponder 10 is placed inside package 200 as previously discussed and illustrated in FIGS. 8A and 8B.

One embodiment to detect the opening of package 200 is to provide tabs 100 constructed out of a material that reacts to ambient air. When package 200 is opened, tabs 100 become exposed to the outside air. If tabs 100 are constructed out of a material that loses its conductivity when exposed to air, transponder 10 cannot be interrogated and/or communicate as effectively since tabs 100 are attached to slot 300 to provide a slot antenna 16A for communication. Thus, lack of communication or degredated communication can be used as an indicator that package 200 has been previously opened.

FIG. 8B illustrates an embodiment where it is not only desirable to place transponder 10 inside package 200, but also to separate transponder 10 from the contents of package 200. In this embodiment, a second seal 304 is provided in package 200. The transponder 10 is located in first seal 306 as previously described above. The transponder 10 is still exposed to air when package 200 is opened, but transponder 10 is not contained in the same portion of package 200 where the contents of package 200 are contained. This embodiment may be desirable when the contents of package 200 are food or liquid for consumption, or other materials where it is not safe or desirable for transponder 10 to come in contact with the contents of package 200.

Another embodiment uses sensor 20 to determine when package 200 is opened. Sensor 20 may be any type of sensor that senses elements of air in the area on the outside of package 200. Air contains oxygen, nitrogen and other gaseous elements. For instance, sensor 20 may be an oxygen sensor, including the sensor described in U.S. Pat. No. 6,027,622, entitled "Sensor element," incorporated herein by reference in its entirety. Further, sensor 20 can be any type of sensor that senses an environmental factor, such as a gaseous element, that is not contained inside package 200 when sealed with transponder 10 therein.

Figure 9:
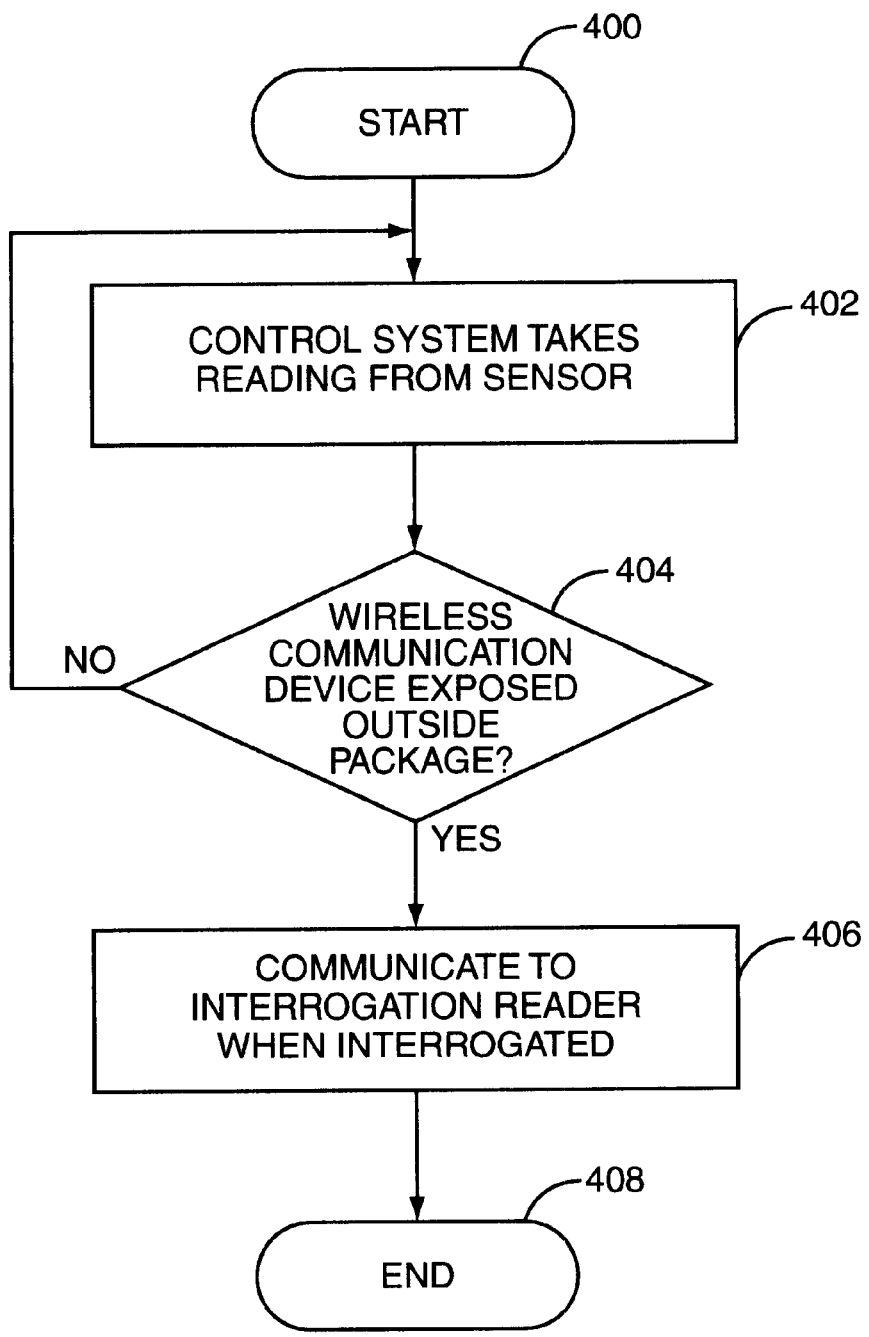
FIG. 9 is a flowchart illustrating the operation of the wireless communication device when sensing to detect its presence outside of a package.

FIG. 9 illustrates a flow chart of one embodiment of transponder 10 using sensor 20 to determine if package 200 has been opened. The process starts (block 400) and control system 12 receives signals from sensor 20 indicating a reading (block 402). The control system 12 determines if reading from sensor 20 indicates that package 200 is opened (decision 404). If package 200 is opened, control system 102 stores this event in memory 18 to communicate it the next time transponder 10 is interrogated by interrogation reader 50 (block 406). If transponder 10 has transmission capability, transponder 10 may transmit the event of package 200 being open immediately. The process then ends (block 408). Alternatively, if it is determined that the package 200 is not open (decision 404), transponder 10 takes another reading from sensor (block 402), repeating the process again.

Figure 10:
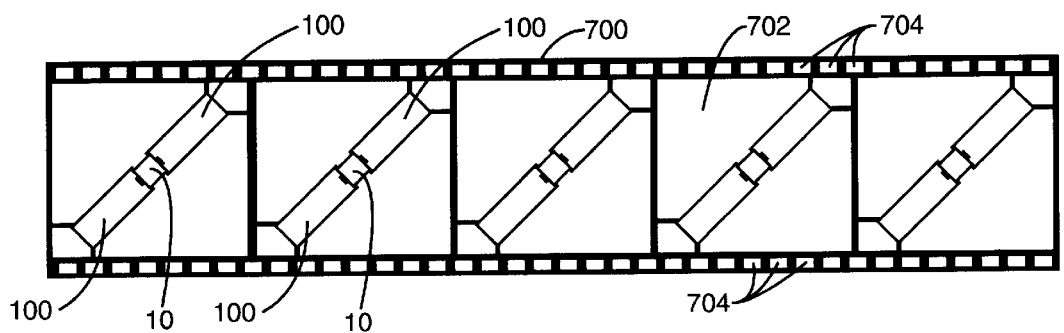
FIG. 10 is a schematic diagram of wireless communication devices mounted on a carrier or support for stamping into packages in an assembly line.

FIG. 10 illustrates an embodiment of providing transponders 10 for stamping onto packages 200 in an assembly line or other manufacturing capacity. A carrier 700 is provided that contains individual slides 702. Carrier 700 may be a film or other similar type of material. Transponder 10 is manufactured and placed on carrier 700 during assembly whereby each portion 702 contains one transponder 10. The carrier 700 is constructed out of a conductive material. Carrier 700 may also contain, as part of its construction, one or more conductive tabs 100. Since carrier 700 is a conductive material, tabs 100 are conductive. Transponder 10 is placed onto carrier during assembly and connected to tabs 100 formed in carrier 700. Later during the manufacture or assembly process, transponder 10 is placed onto packages 200. Carrier 700 may have perforations 704 for movement by a machine in an assembly line when mounting transponders 10 to portions 702. Transponder 10, attached to one or more tabs 100 formed in carrier 700, is stamped onto packages 200 in an assembly line by placing carrier 700 proximate to packages 200. The carrier 700 is stamped in such a manner that transponder 10, with tabs 100 attached, is placed onto packages 200. When desired, a stamping process places carrier 700 and a particular portion 702 in contact with package 200 so that transponder 10 is more easily attached to package 200. The package 200 may contain slot 300, whereby transponder 10 is stamped across the slot 300. Transponder 10, tabs 100, or both, may also contain an adhesive 102, as previously discussed, so that transponder 10 attaches to package 200 securely.

Figure 11A:
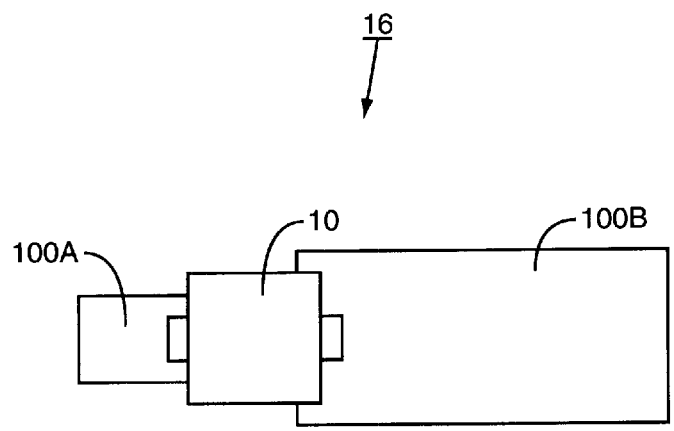
FIG. 11A is a top plan view of a wireless communication device with an asymmetrical antenna arrangement.

FIG. 11A illustrates a top view of transponder 10 having an asymmetrical dipole antenna 16. An asymmetrical dipole antenna 16 is an antenna having a first pole different in shape, including, but not necessarily limited to length, width, volume, and/or density, from the second pole. In FIG. 11A, transponder 10 is coupled to two conductive tabs 100A, 100B. The first conductive tab 100A is asymmetrical with respect to the second conductive tab 100B. The two symmetrical tabs 100A, 100B comprises asymmetrical dipole antenna 16.

Figure 11B:
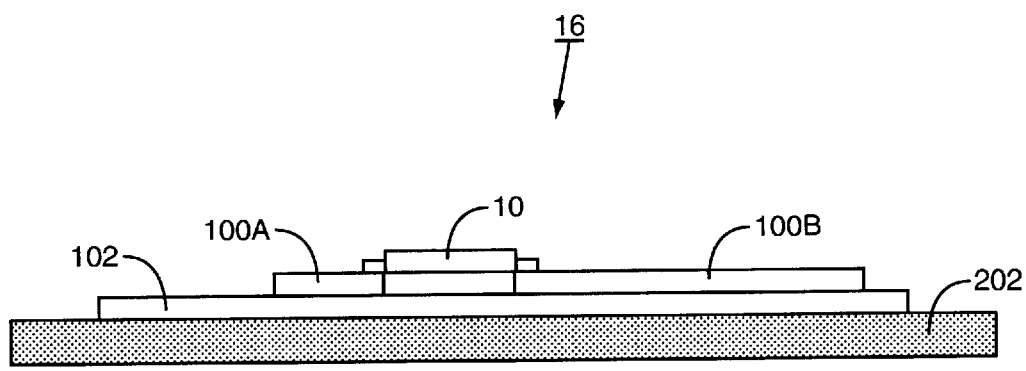
FIG. 11B is a side elevational view of the wireless communication device of FIG. 11A.

FIG. 11B illustrates a side view of one embodiment of the transponder 10 illustrated in FIG. 11A. Tabs 100A, 100B are placed on a dielectric 102. Dielectric 102 acts as an insulator between tabs 100A, 100B and substrate 202. Dielectric 102 is a material that is substantially non-conductive. Examples of materials that may be used to form a dielectric 102 include, but are not limited to: cardboard, plastic, Lexan plastic, fabric, and polypropylene.

If substrate 202 is constructed out of a conductive material, a separate dielectric 102 is provided between substrate 202 and transponder 10 as illustrated in FIG. 11B. If substrate 202 is constructed out of a non-conductive material, substrate 202 may additionally act as dielectric 102. In this case, a ground plane (not shown) may be placed on the opposite side of substrate 202, so that substrate 202, acting as a dielectric 102, is in between transponder 10 and the ground plane. Note that the ground plane may be placed on other places on substrate 202 and not necessarily on the opposite side from transponder 10.

The shape, type, and characteristics of antenna 16 affect the impedance of transponder 10. The substrate 202 also affects the impedance presented to transponder 10 by antenna 16. This is especially true when a thin dielectric 102 is used, because there is less insulation between the transponder 10/antenna 16 and substrate 202. A thin dielectric 102 is between approximately 0.1 mm and 2.0 mm. For transponder 10 to transfer radiation energy from antenna 16 at the highest radiation level possible without losses, the impedance of the transponder 10 should be matched to the impedance of antenna 16 as placed onto substrate 202. For example, in one embodiment, the transponder 10 may have an impedance of 15–j60 ohms. To get optimum transfer of energy between antenna 16 and transponder 10, antenna 16, as placed onto substrate 202, would need to have a conjugate impedance of transponder 10. In practice, impedance matching between transponder 10 and antenna 16 does not have to be exact to have energy transfer between transponder 10 and antenna 16 necessary for communication. Impedances between transponder 10 and antenna 16 that are substantially the same will still allow good energy transfer between antenna 16 and transponder 10.

The transponder 10 may be used with a variety of different substrates 202. To minimize the protrusion of transponder 10 from substrate 202, a thin dielectric 102 is used. Empirical and modeling data have shown that the operation of an asymmetric antenna 16 is substantially insensitive to the size and/or dimensions of substrate 202 when using a dielectric 102 that is relatively thin. Materials with poorly defined structures and/or dielectric constants, such as cardboard, can be used as dielectric 102 materials, which also sever as substrate 202. This discovery allows antenna 16 and transponder 10 impedance to be matched more easily during manufacture without having to take characteristics of substrate 202 into consideration, such as substrate 202 size, thickness, and/or dielectric constant. Substrate 202 does have a certain dielectric constant depending on its material of manufacture and the amount of air present in substrate 202. The dielectric constant is the amount of permissivity of a particular material. In addition, antenna 16 elements, such as tabs 100, do not need precise dimensional control, allowing less precise and less expensive materials and methods to be used to define such elements. For example, tabs 100 may be constructed using label printing techniques and conductive ink, such as described in U.S. Pat. No. 5,566,441, entitled "Attaching an electronic circuit to a substrate," incorporated herein by reference in its entirety.

In the embodiment illustrated in FIGS. 11A and 11B, asymmetrical tabs 100A, 100B act as the asymmetrical antenna 16. Although the impedance of tabs 100A, 100B are substantially insensitive to substrate 202, tabs 100A, 100B may be increased or decreased in size, length, and/or width depending on variations in the thickness and dielectric constant of substrate 202 to provide optimal impedance matching to transponder 10.

Figure 12A:
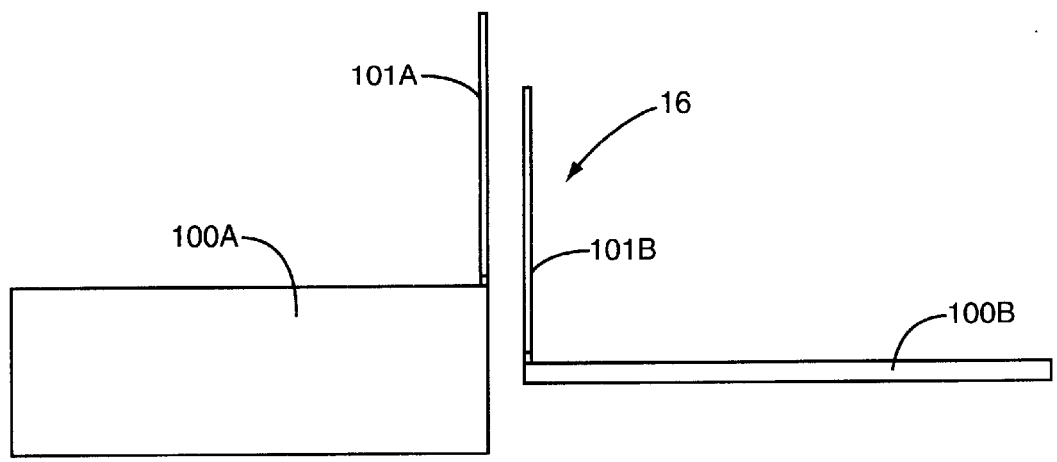
FIG. 12A is a schematic diagram of a particular asymmetrical antenna arrangement.
Figure 12B:
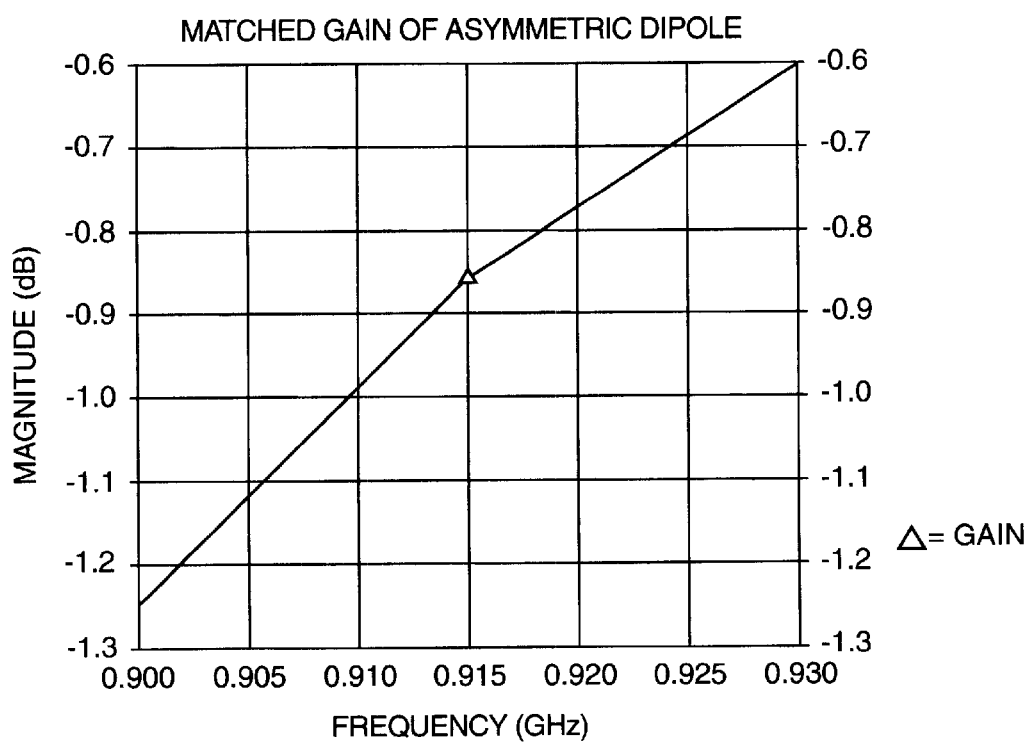
FIG. 12B is a schematic diagram of the matched gain of the particular asymmetrical antenna arrangement in FIG. 12A.
Figure 12C:
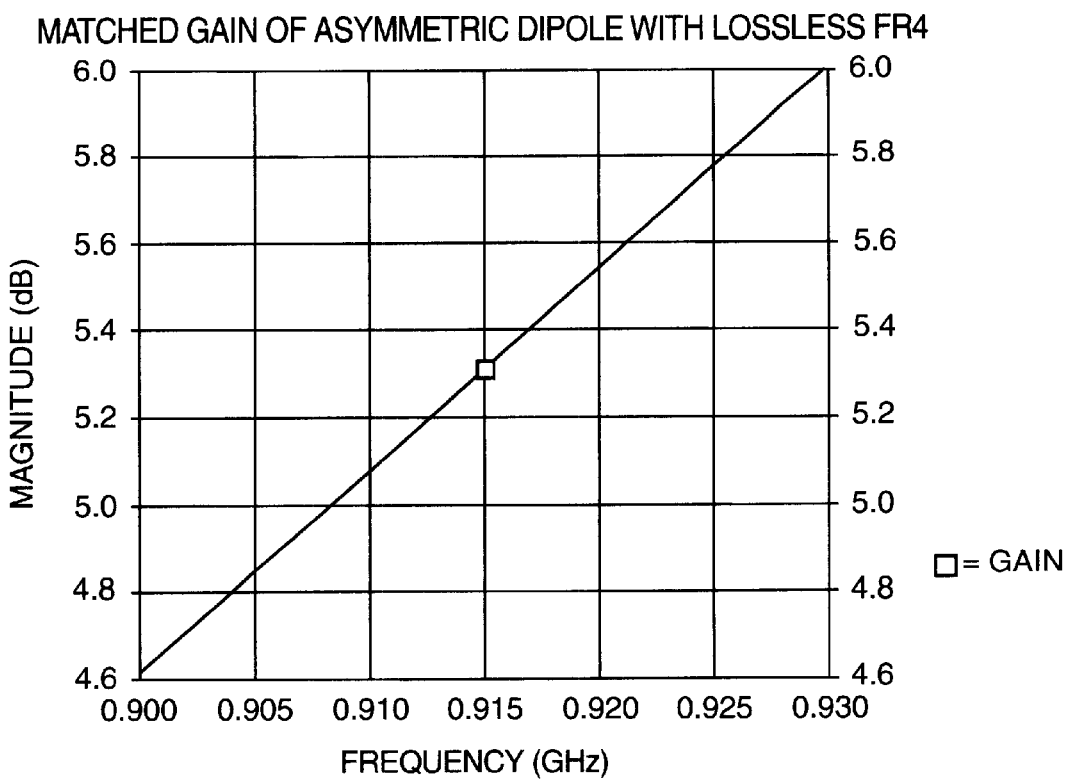
FIG. 12C is a schematic diagram of the matched gain of the particular asymmetrical antenna arrangement in FIG. 12A with lossless FR4.

FIG. 12A illustrates one modeled example of asymmetrical tabs 100A, 100B used on a substrate 202. Substrate 202 is a common printed circuit board (PCB) material FR4 with an approximate dielectric constant of 4.65. Two additional tabs 101A, 101B are added to tabs 100A, 100B respectively to allow proper modeling and have no effect on results of the asymmetrical antenna 16. FIG. 12B illustrates the predicted gain of antenna 16, which is −0.85 dBi at 915 MHz. FIG. 12C illustrates the modeled gain of an asymmetrical antenna 16, using tabs 100A, 100B, on a substrate 202 having the same dielectric constant as FR4 without losses. The predicted gain for this model is 5.3 dBi at 915 MHz.

Figure 13:
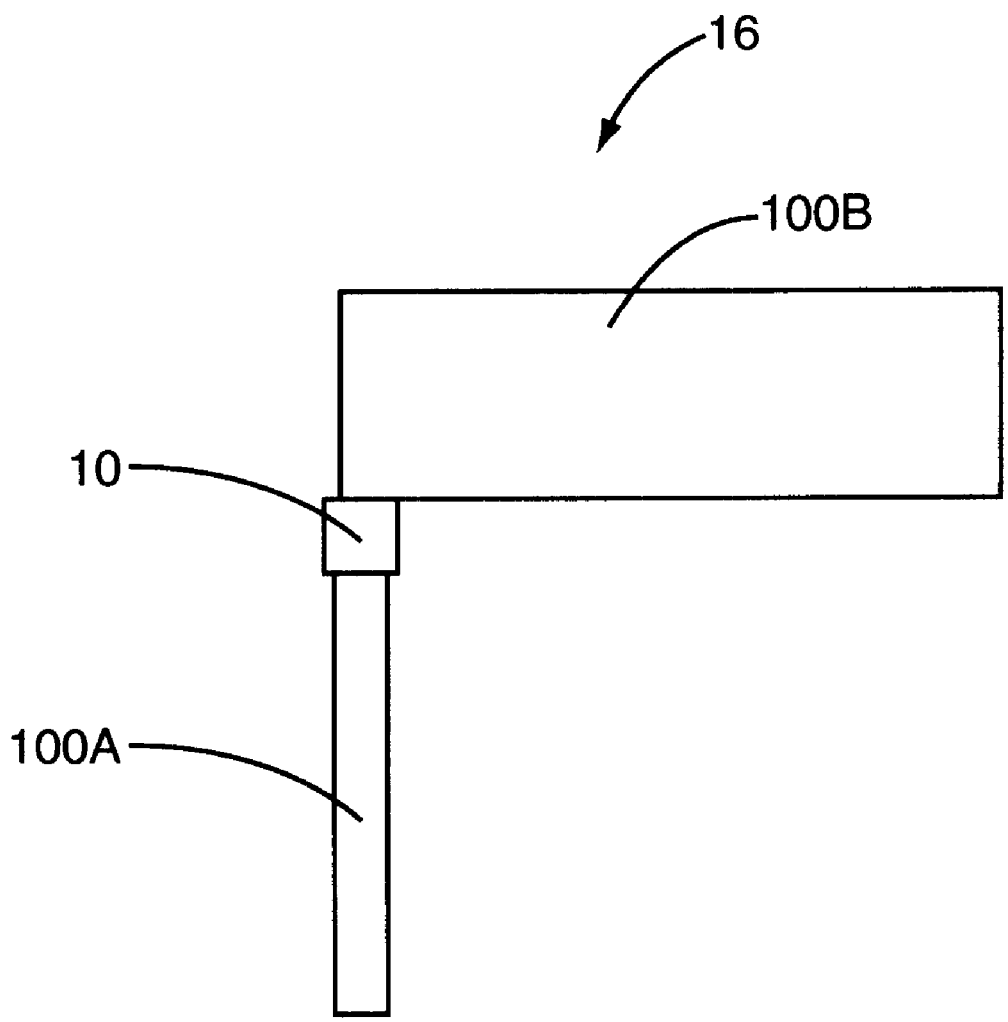
FIG. 13 is a schematic diagram of an alternative asymmetrical antenna arrangement.
Figure 14A:
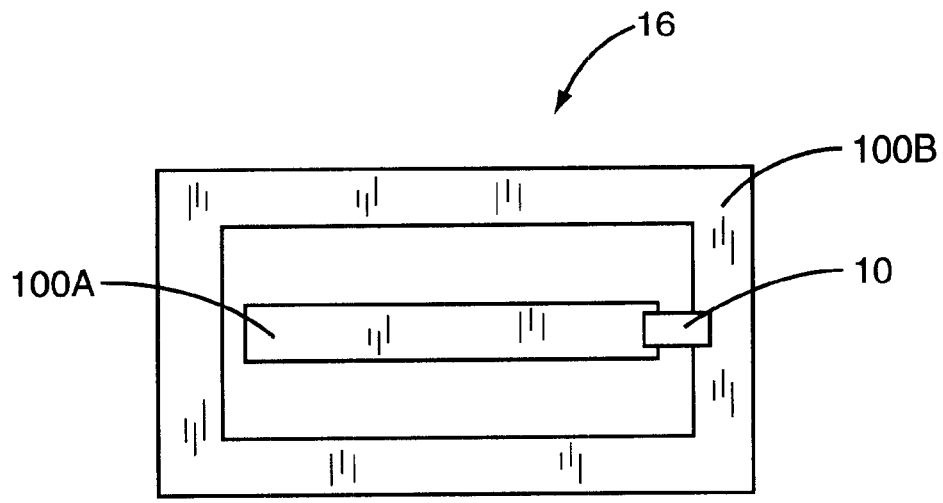
FIG. 14A is a schematic diagram of another alternative asymmetrical antenna arrangement.
Figure 14B:
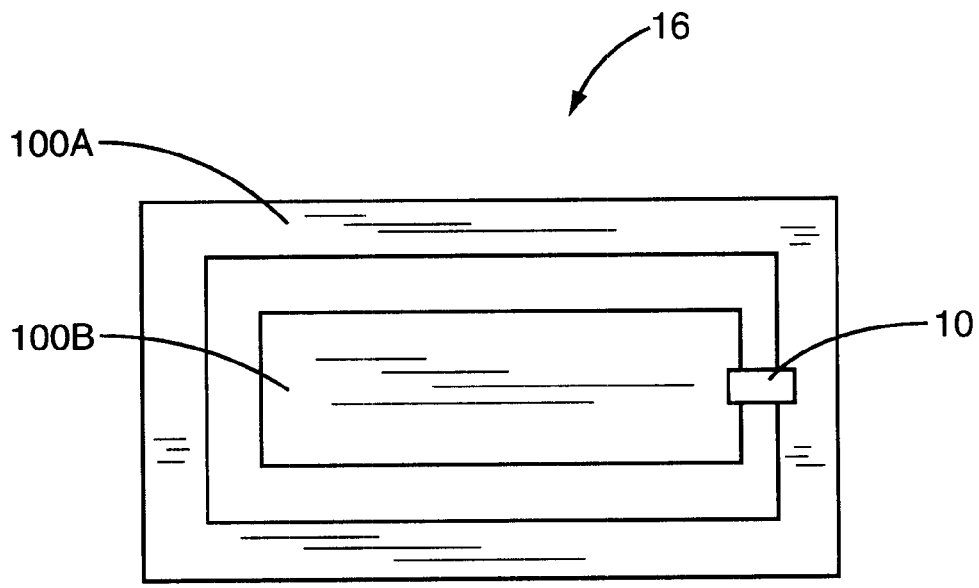
FIG. 14B is a schematic diagram of a second embodiment of the alternative asymmetrical antenna arrangement of FIG. 14A.

As previously stated, tabs 100A, 100B may vary in size in different manners to provide an asymmetrical antenna 16. FIGS. 13, 14A and 14B illustrate other embodiments of asymmetrical antennas 16. FIG. 13 illustrates an embodiment of an asymmetrical antenna 16, whereby tabs 100A, 100B are at right angles to each other. One tab 100A is substantially thinner than the other tab 100B. The performance of the asymmetrical antenna 16 illustrated in FIG. 13 was found to have similar performance characteristics of the asymmetrical antenna 16 illustrated in FIG. 12A.

FIGS. 14A and 14B illustrate two other embodiments of an asymmetrical antenna 16. In FIG. 14A, one tab 100B, hereto represented as being thicker than tab 100A, is in the shape of a ring, and the other tab 100A is nested inside the area bounded by tab 100B. This asymmetrical antenna 16 is almost one-half the total length of the asymmetrical antenna 16 illustrated in FIG. 12A, and may be used in applications where a shorter asymmetrical antenna 16 is desired. Similarly, FIG. 14B depicts another alternate embodiment of asymmetrical antenna 16. In contrast to the embodiment of FIG. 14A, a relatively thick tab 100B is nested within tab 100A, which is arranged in the shape of a ring or loop. Again, asymmetrical antenna 16 in FIG. 14B, is almost one-half the total length of the asymmetrical antenna 16 illustrated in FIG. 12A, and may be used in applications where a shorter asymmetrical antenna 16 is desired. For example, a shorter asymmetrical antenna 16 may be advantageous for design or manufacturing reasons.

Figure 15A:
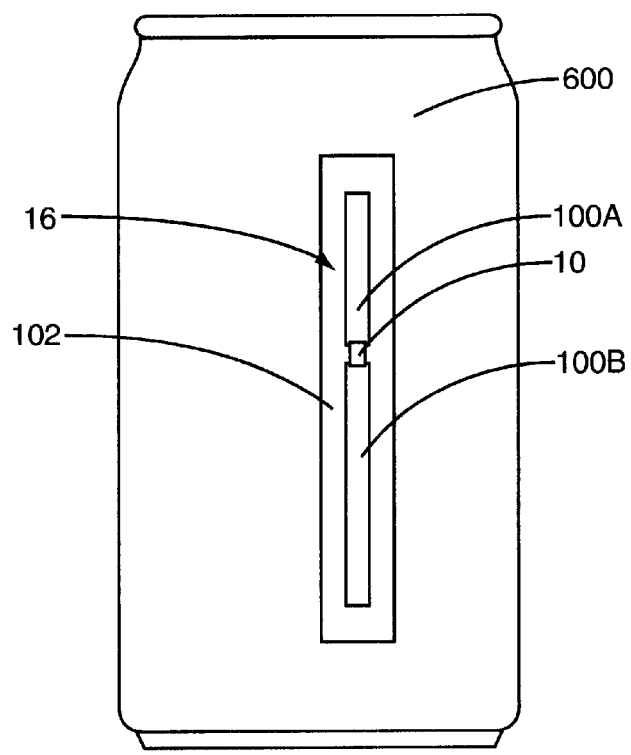
FIG. 15A is a schematic diagram of a wireless communication device having an asymmetrical antenna arrangement on a side of an aluminum beverage can.
Figure 15B:
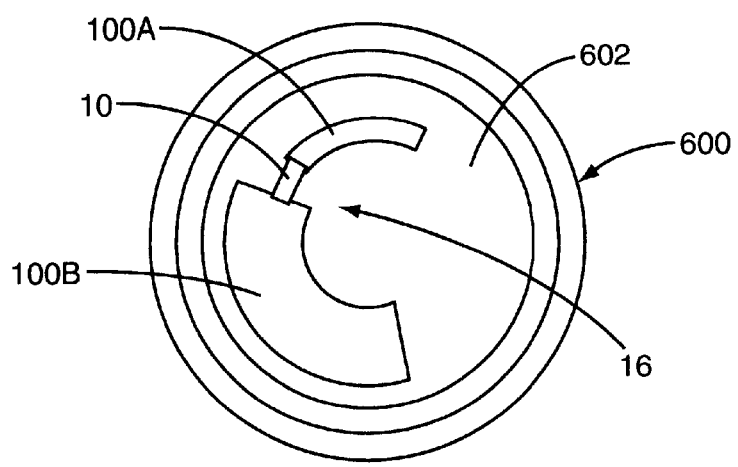
FIG. 15B is a schematic diagram of wireless communication device having an asymmetrical antenna arrangement on the bottom dome of an aluminum beverage can.

FIG. 15A illustrates another embodiment of an asymmetrical antenna dipole antenna 16, whereby substrate 202 is an aluminum can 600. A separate dielectric 102 is provided between transponder 10 having tabs 100A, 100B and can 600, because can 600 is constructed out of a conductive material namely aluminum (as previously discussed). In this particular embodiment, an asymmetrical antenna 16 is created by using tab 100B that is longer in length than tab 100A. FIG. 15B illustrates another asymmetrical antenna embodiment, again using a can 600 as substrate 202. Transponder 10 is placed on the underneath dome 602 of can 600. Two asymmetrical tabs 100A, 100B are provided to form a dipole antenna 16. The resultant dipole antenna 16 is asymmetrical. Tab 100A is shorter in length than tab 100B, and tab 100B is wider than tab 100A.

Figure 16:
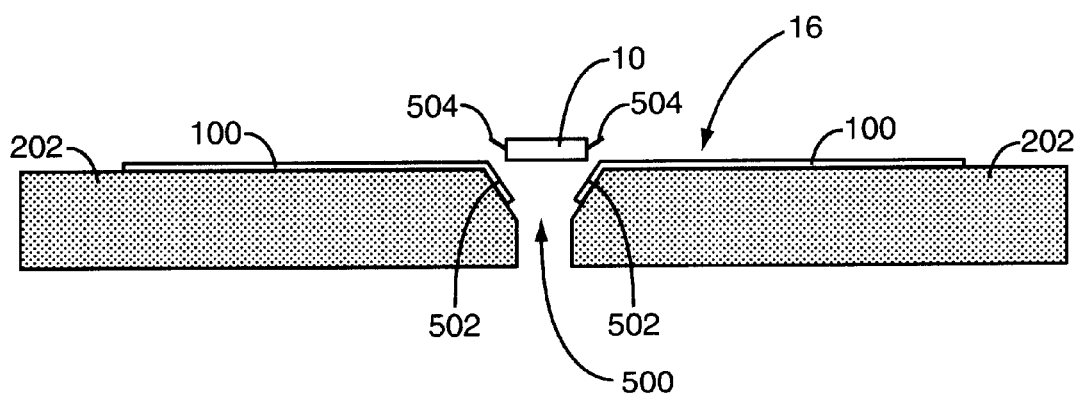
FIG. 16 is a schematic diagram of a wireless communication device mounting arrangement.

FIG. 16 illustrates another embodiment of an asymmetrical dipole antenna 16. In this embodiment, transponder 10 is placed into an indentation 500 of substrate 202 so that transponder 10 will not protrude from substrate 202. Transponder 10 may be damaged or hit by an outside force if it protrudes from substrate 202. Tabs 100A, 100B are provided on the surface of substrate 202 on each side of indentation 500. Conductive leads 502 are placed on the inside of indentation 500 and are electrically coupled to tabs 100A, 100B. Such coupling may be accomplished by direct connection, capacitive coupling or inductive coupling. Tabs 100A, 100B are asymmetrical to one another. Transponder 10 has feed lines 504 on each side that couple to conductive leads 502 to couple transponder 10 and tabs 100A, 100B together. In this manner, transponder 10 uses tabs 100A, 100B to form an asymmetrical dipole antenna 16. As illustrated, transponder 10 has not yet been positioned inside indentation 500 below the surface level of substrate 202. When properly positioned, transponder 10 does not protrude from the surface of substrate 202.

Figure 17:
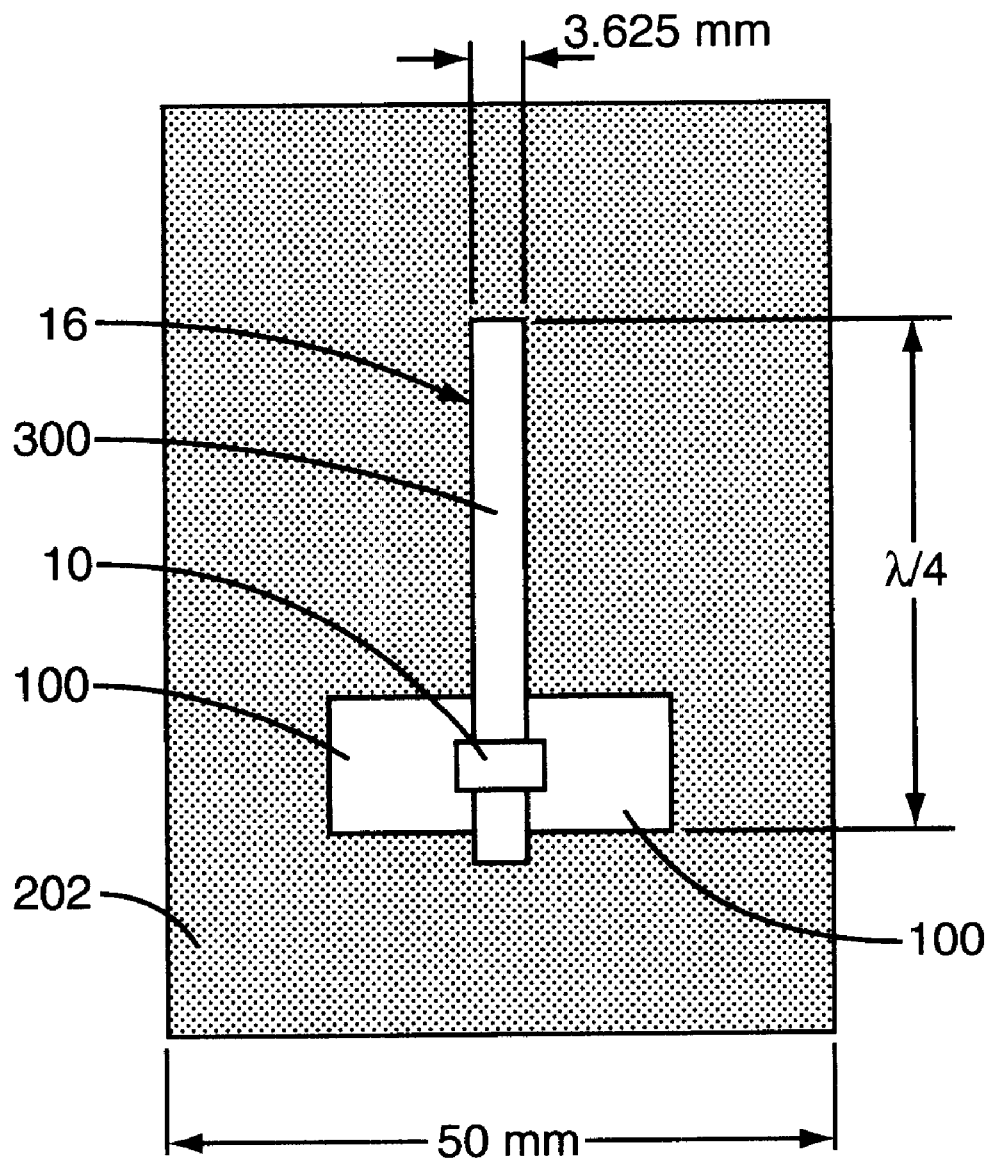
FIG. 17 is a schematic diagram of a wireless communication device using an asymmetrical slot antenna.

FIG. 17 illustrates another embodiment of an asymmetrical antenna 16. In this embodiment, the asymmetrical antenna 16 is provided using a slot 300 to form an asymmetrical slot antenna 16. In this particular embodiment, slot 300 length is λ/4 and slot 300 width is 3.625 mm, although other lengths and widths may be used. Transponder 10 is placed across the slot 300 using tabs 100 to form a slot antenna 16. The asymmetrical nature of the slot antenna 16 is controlled by the location of the placement of tabs 100 across slot 300, and not by differences in the size, width, and/or density of tabs 100. Tabs 100 are placed off-center of slot 300, thereby forming an asymmetrical slot 300. An asymmetrical slot 300 is a slot that is split into at least two separate portions whereby each portion is of different size, width, and/or depth. If substrate 202 is constructed out of a conductive material, a separate dielectric 102 is provided between transponder 10 and substrate 202. If substrate 202 is constructed out of a non-conductive material, substrate 202 is dielectric 102 with a ground plane provided (not shown). Again, this asymmetrical antenna 16 is substantially insensitive to substrate 202 when using a thin dielectric 102, as previously discussed above.

An alternative embodiment to FIG. 17 is to only couple one tab 100 to transponder 10 to provide a monopole asymmetric antenna 16. Again, tab 100 is placed off-center across slot 300. A ground plane is provided and coupled to transponder 10 so as to ground transponder 10.

Certain modifications and improvements will occur to those skilled in the art upon a reading of the foregoing description. It should be understood that the present invention is not limited to any particular type of wireless communication device, tabs, packaging, or slot arrangement. For the purposes of this application, couple, coupled, or coupling is defined as either directly connecting or reactive coupling. Reactive coupling is defined as either capacitive or inductive coupling. One of ordinary skill in the art will recognize that there are different manners in which these elements can provide to accomplish the present invention. The present invention is intended to cover what is claimed and any equivalents. The specific embodiments used herein are to aid in the understanding of the present invention, and should not be used to limit the scope of the invention in a manner narrower than the claims and their equivalents.

What is claimed is:

1. A device, comprising:
   a wireless communication device;
   two conductive tabs coupled to said wireless communication device to form a dipole antenna wherein said two conductive tabs asymmetrically arranged with respect to each other;
   a thin dielectric coupled to said two conductive tabs; and
   a ground plane coupled to said thin dielectric, wherein said thin dielectric is between said two conductive tabs and said ground plane.

2. The device of claim 1, wherein said wireless communication device operates in a frequency from the group consisting of UHF, VHF.

3. The device of claim 1, wherein said wireless communication device operates at an operating frequency from the group consisting of 2.45 GHz, 915 MHz, and 13.56 MHz.

4. The device of claim 1, wherein at least one conductive tab of said two conductive tabs contains an adhesive.

5. The device of claim 1, wherein at least one conductive tab of said two conductive tabs is an adhesive.

6. The device of claim 1, wherein said two conductive tabs are constructed out of a conductive ink.

7. The device of claim 1, wherein one of said two conductive tabs is λ/2 in length.

8. The device of claim 1, wherein one of said two conductive tabs is λ/4 in length.

9. The device of claim 1, wherein one of said two conductive tabs is a different length than the other tab of said two conductive tabs.

10. The device of claim 1, wherein one of said two conductive tabs is a different width than the other tab of said two conductive tabs.

11. The device of claim 1, wherein said two conductive tabs are at right angles with respect to each other.

12. The device of claim 1, wherein the first of said two conductive tabs is in the shape of a ring, and the other of said two conductive tabs is nested inside said first conductive tab.

13. The device of claim 1, wherein the second of said two conductive tabs is in the shape of a loop surrounding the first conductive tab.

14. A wireless communication system, comprising:
   a wireless communication device attached to a substrate;
   two conductive tabs coupled to said wireless communication device wherein said two conductive tabs are asymmetrically arranged with respect to each other to form an asymmetrical dipole antenna, and
   a thin dielectric attached between said two conductive tabs and said substrate.

15. The system of claim 14, wherein said at least one conductive tab is two conductive tabs that are asymmetrically arranged with respect to each other to form an asymmetrical dipole antenna.

16. The system of claim 15, wherein one of said two conductive tabs is a different length than the other tab of said two conductive tabs.

17. The system of claim 15, wherein one of said two conductive tabs is a different width than the other tab of said two conductive tabs.

18. The system of claim 15, further comprising a ground plane coupled to said wireless communication device, wherein said thin dielectric is between said wireless communication device and said ground plane.

19. The system of claim 14, wherein said at least one conductive tab is attached off-center across a slot on said substrate to form an asymmetrical slot antenna.

20. The system of claim 19, wherein said at least one conductive tab is two conductive tabs.

21. The system of claim 19, further comprising a ground plane coupled to said wireless communication device wherein said thin dielectric is between said wireless communication device and said ground plane.

22. The system of claim 21, wherein said ground plane is attached on a side of said substrate opposite from said wireless communication device.

23. The system of claim 21, wherein said substrate is said ground plane.

24. The system of claim 19, wherein said slot is rectangular shaped.

25. The system of claim 19, wherein said slot is λ/2 in length.

26. The system of claim 19, wherein said two conductive tabs are 10 mm square tabs.

27. The system of claim 14, wherein said substrate is comprised of a non-conductive material.

28. The system of claim 27, wherein said thin dielectric is said substrate.

29. The system of claim 27, wherein said substrate is comprised from the group consisting of cardboard, polyester fabric, and plastic.

30. The system of claim 14, wherein said substrate is comprised out of a conductive material.

31. The system of claim 30, wherein said substrate is an aluminum can.

32. The system of claim 14, wherein said thin dielectric is equal to or less than 0.2 mm.

33. The system of claim 14, wherein said thin dielectric is comprised, from the group consisting of cardboard, plastic, clear plastic, Lexan, and polypropylene.

34. The system of claim 14, wherein said wireless communication device comprises conductive feed lines placed in an indentation in said substrate.

35. The system of claim 34, wherein said at least one conductive tab is two conductive tabs that are on the surface of said substrate on each side of said indentation wherein said indentation contains conductive material inside coupled to said two conductive tabs.

36. A method of constructing a wireless communication device to be attached to a substrate, comprising:
   coupling at least two conductive tabs of differing size to a wireless communication device to form an asymmetrical dipole antenna;
   coupling said two conductive tabs to the substrate; and
   placing a thin dielectric in between said two conductive tabs and the substrate.

37. The method of claim 36, further comprising:
   attaching a ground plane on said substrate; and
   coupling said wireless communication device to said ground plane.

38. The method of claim 37, wherein said ground plane is on a side of the substrate opposite from said wireless communication device.

39. A method of constructing a wireless communication device to be attached to a substrate, comprising:
   creating a slot in the substrate;
   coupling two conductive tabs of differing size to a wireless communication device to form an asymmetrical dipole antenna; and
   coupling said two conductive tabs to said slot to form an asymmetrical slot antenna;
   coupling said wireless communication device to the substrate; and
   placing a thin dielectric in between said wireless communication device and the substrate.

40. The method of claim 39, further comprising:
   attaching a ground plane on said substrate; and
   coupling said wireless communication device to said ground plane.

41. The method of claim 40, wherein said ground plane is attached on a side of the substrate opposite from said wireless communication device.

42. A device, comprising:
   a wireless communication device;
   two conductive tabs coupled to said wireless communication device to form a dipole antenna; and
   said two conductive tabs asymmetrically arranged with respect to each other, wherein the first of said two conductive tabs is in the shape of a ring, and the other of said two conductive tabs is nested inside said first conductive tab.

43. A device, comprising:

a wireless communication device;

two conductive tabs coupled to said wireless communication device to form a dipole antenna; and said two conductive tabs asymmetrically arranged with respect to each other, wherein the second of said two conductive tabs is in the shape of a loop surrounding the first conductive tab.

44. A method of constructing a wireless communication device to be attached to a substrate, comprising:

creating a slot in the substrate;

coupling two conductive tabs of differing size to a wireless communication device; and coupling said two conductive tabs to said slot to form an asymmetrical slot antenna.

45. The method of claim 44, further comprising placing a thin dielectric in between said two conductive tabs and the substrate.

46. The method of claim 44, further comprising: attaching a ground plane on the substrate; and coupling said wireless communication device to said ground plane.

47. The method of claim 46, wherein said ground plane is attached on a side of the substrate opposite from said wireless communication device.

* * * * *